M. ZUTMAN.
VEHICLE TOP.
APPLICATION FILED JUNE 20, 1917.
1,390,418.
Patented Sept. 13, 1921.
2 SHEETS—SHEET 1.
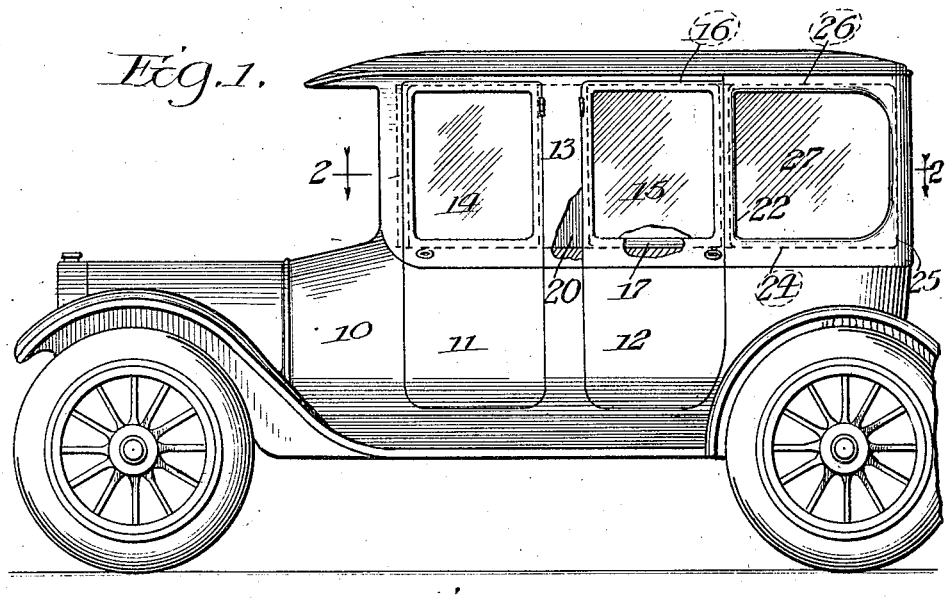
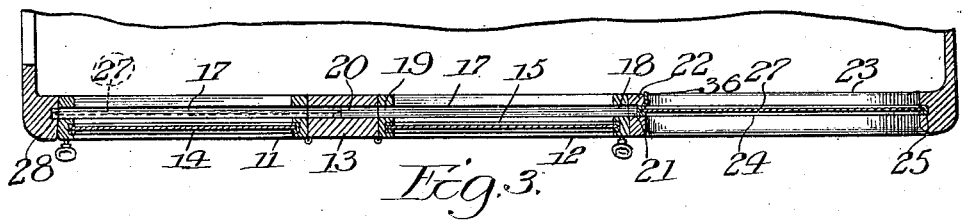
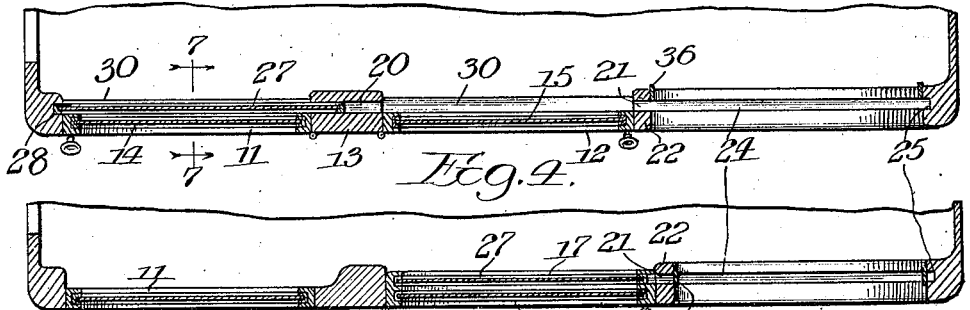
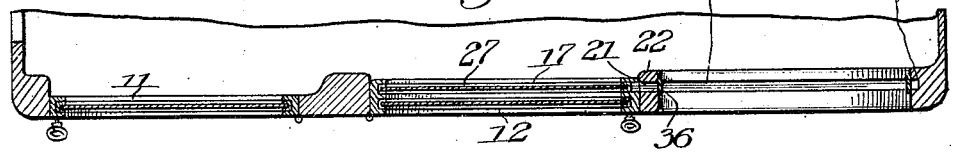
Inventor
Morres Zutman
by Otto M. Nernich Atty M. ZUTMAN.
VEHICLE TOP.
APPLICATION FILED JUNE 20, 1917.
1,390,418.
Patented Sept. 13, 1921.
2 SHEETS—SHEET 2.
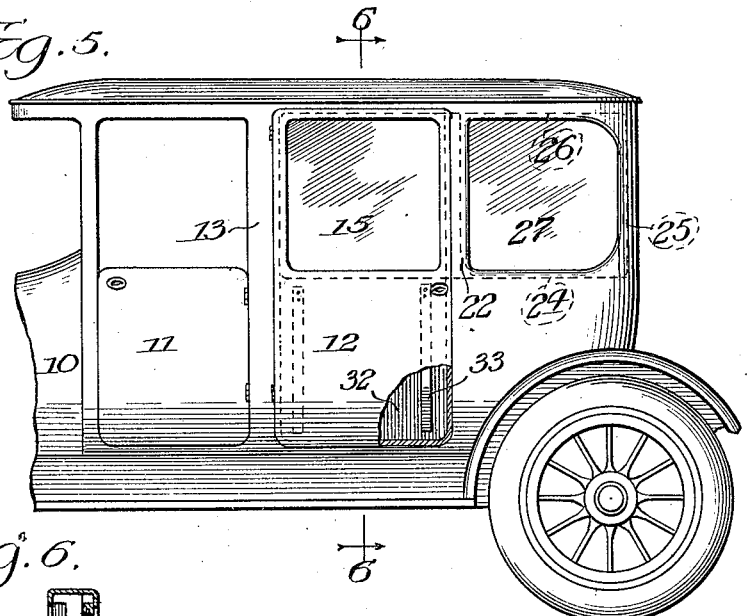
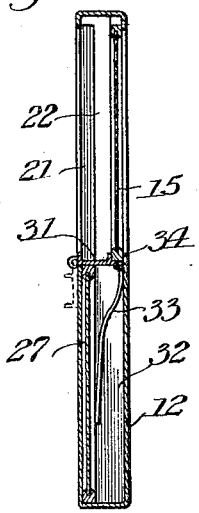
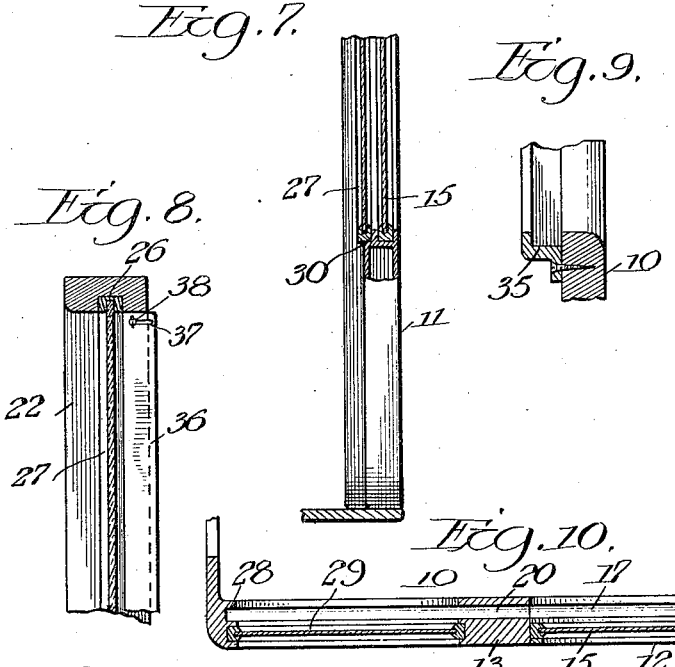
Inventor
Morres Zutman
by Otto M. Wernich Atty.

UNITED STATES PATENT OFFICE.

MORRES ZUTMAN, OF CHICAGO, ILLINOIS.

VEHICLE-TOP.

1,390,418.　　　　Specification of Letters Patent.　　Patented Sept. 13, 1921.

Application filed June 20, 1917. Serial No. 175,736.

*To all whom it may concern:*

Be it known that I, MORRES ZUTMAN, a citizen of the United States, residing at Chicago, in the county of Cook and State of Illinois, have invented a certain new and useful Improvement in Vehicle-Tops, of which the following is a full, clear, concise, and exact description, reference being had to the accompanying drawings, forming a part of this specification.

The invention relates to improvements in vehicle tops and primarily to those having windowed sides, the windows of which may be manipulated and positioned so that a closed top may be transformed into an open one, or vice versa, without necessitating the complete removal of said windows from said top.

The object of the invention is the production of an arrangement whereby said windows may easily and quickly be shifted from one end of the car toward the other without interfering with the normal operation of the doors of the vehicle body and particularly with the door of that portion of the vehicle occupied by the passengers. A further object of the invention is to produce a construction whereby the door forming the closure for the driver may also be opened and closed without interference with the window which may have been shifted into the path of this door during the transformation.

Another object is to produce the above in a simple and expeditious manner utilizing a construction which may be applied to a top not having these facilities.

The invention will be more readily understood when read in conjunction with the accompanying drawings, in which—

Figure 1 is a side elevation of a vehicle having a top constructed in accordance with my invention;

Fig. 2 is a section taken on line 2—2 of Fig. 1;

Figs. 3 and 4 are sectional views of modified forms of constructions;

Fig. 5 is a side elevation of a vehicle having a construction whereby the windows of the door and body portion may be retained in the lowermost portion of said door.

Fig. 6 is a sectional view taken on line 6—6 of Fig. 5;

Fig. 7 is a sectional view taken on line 7—7 of Fig. 3;

Fig. 8 is a sectional view of a detail of construction;

Fig. 9 is a sectional view showing a means for applying the invention to a top not embodying the invention in its original design; and Fig. 10 is a sectional view similar to Fig. 2, showing the invention applied to a top which has only one door in its side instead of two as illustrated in Fig. 1.

In the embodiment of the invention shown in Fig. 1, the same is illustrated as applied to a vehicle body 10 having the usual front and rear doors 11 and 12 which are separated by the panel 13. These doors lead to the front and rear seats of the vehicle and are provided with the windows 14 and 15 which may be lowered into the lowermost portion of the door casing in the usual manner. The innermost side of these doors are each provided near the upper and lower edges of the windows 14 and 15 with the grooves 16 and 17. The sides of said door frames are also provided with the vertical slots 18 and 19, which register with the slot 20 in the panel 13 and also with the vertical slot 21 in the upright 22 arranged between the door 12 and the rearmost portion 23 of the vehicle body. The side of this end portion 23 normally carries the rear side window 27 and is designed to slide in the grooves 24, 25, and 26 provided in said end 23. These grooves 24 and 25 aline with the grooves and slots in said doors and panels and form a continuous passage within which the rear window 27 may be slid from the position shown in Fig. 1 to the front of the car, as shown in dotted lines in Fig. 2. The foremost end of said vehicle body may also be provided with a groove 28 to receive the forward end of the window 27 when same is caused to assume a position at the forward end of the vehicle.

From the foregoing it can readily be seen that when the window 27 is caused to assume this last named position, the door 11 cannot be opened, due to the fact that said window 27 extends beyond the side edge thereof into the groove 28 and the slot 20, and beyond the door 12 so that same may be swung open or closed, and that ingress or egress to and from the rear compartment of the car is not interfered with.

While I have illustrated the vehicle in

Fig. 1 as being provided with the door 11, it is apparent that the door may be eliminated and a window 29 arranged at this end in its stead as shown in Fig. 10. In the embodiment of the invention shown in Fig. 3, the window 27 may be shifted from the rear of the car to the front as above explained, but a construction is utilized herein which permits said door 11 to swing outwardly from its closed position without interference with said window 27. To accomplish this the grooves 16 and 17 in said door will be eliminated and a ledge 30 provided in its stead, as shown in Fig. 7. This permits said window to assume the full line position shown in Fig. 3, and also to open the door partially or fully, as is sometimes desirable while driving.

By referring to Fig. 4 it will be seen that an arrangement is therein shown whereby both the window 27 and the door 12 may swing outwardly together without interference. In this case said window 27 will be substantially the same dimensions as the window in said door. Furthermore the slot in the panel 13 is eliminated, the glass 27 being held with relation to the door by the grooves 16 and 17.

In the structure shown in Figs. 5 and 6 the window 27 is designed to be dropped into the lowermost portion of the door instead of being passed beyond the panel 13. When a structure such as this is desired the uppermost end of the door below the window therein will be provided with a removable ledge 31 which when removed permits the window 27 to enter the top of the door below said window and be deposited in the compartment 32. This compartment may be provided with the springs 33—33 which are conveniently fastened to the front portion of the door and serve to hold said window in position therein and will yield to permit the window 15 to be dropped into the compartment when same is lifted from its groove 34.

The structure shown in Fig. 9 illustrates a means whereby a top not having the invention applied thereto may be transformed so that same will have these advantages. When this is desired each of the doors and the inside face of the vehicle top will be provided adjacent the upper and lower edge of the window 27 with the recessed member 35, within which said window may slide, this member and the inner side face of the top forming a groove similar to the grooves 24 and 25.

The slot 21 in the upright 22 may be closed by the closure 36 when the window 27 is positioned at the forward end of the vehicle. This closure is slotted as shown at 37 to receive the winged set screw 38 and to permit same to be shifted back and forth over or away from the slot 21.

While I have herein shown various forms which the invention is susceptible of, what I claim and desire to cover by Letters Patent is:

1. A vehicle body having a door and a pair of windows arranged in one side of the body of the vehicle, said windows being arranged at the opposite edges of the door, one of said windows and the door being arranged in substantially the same plane, the other window being arranged in another plane in the rear portion of the top of the body, said last mentioned window being movable, a guide for the last mentioned window, said guide and window being arranged in substantial alinement with each other, and said guide extending from the rear to the front portion of the side, the movable window being movable along the guide from its position in the rear of the body to the front portion thereof, and said door being operable when the window is in either of its extreme positions.

2. A vehicle body having a door and a pair of windows arranged in one side of the body of the vehicle, said windows being arranged upon opposite sides of the edges of the door, one of said windows and the door being arranged in substantially the same plane, the other window being arranged in another plane and being movable relative to the door and window, a guide for the movable window, said guide extending from the front to the rear portion of the side and being in substantial alinement with the movable window, to permit the window to be moved from one end of the top to the other to position the movable window upon opposite sides of the door and the door being operable when the movable window is in either of its extreme positions.

3. A vehicle body having a door and a pair of windows arranged in one side of the body of the vehicle, said windows being arranged at the opposite edges of the door, one of said windows and said door being arranged in substantially the same plane, the other window being arranged in another plane in the rear portion of the top of the body, a guide for the last mentioned window, said guide and said movable window being arranged in substantial alinement with each other and said guide extending from the rear to the front portion of the side, the last mentioned window being movable along the guide from its position in the rear of the body to the front portion thereof and said door being operable when said window is in either of its extreme positions.

4. A vehicle top having a window normally closing one end of the top, said window being arranged in a groove and to be moved in said groove from its normal position, a member having a slot through which the window passes when moved, and a movable strip for closing the slot when the window is moved beyond the slot.

5. A vehicle top having a window arranged at one end of the top, and arranged to be moved from one end of the top to the other, a guide for said window, a member having a slot through which the window passes when moved and means for closing the slot when the window is moved beyond the slot.

In witness whereof I hereunto subscribe my name this 15th day of June, A. D. 1917.

MORRES ZUTMAN.

Witnesses:
 HAZEL A. JONES,
 HERBERT L. TRUBE.